UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

METHOD OF HARDENING SYNTHETIC RESINS.

1,323,284.      Specification of Letters Patent.      Patented Dec. 2, 1919.

No Drawing.      Application filed February 3, 1916. Serial No. 76,028.

*To all whom it may concern:*

Be it known that I, RAY P. JACKSON, a citizen of the United States, and a resident of Edgewood Park, in the county of Allegheny and State of Pennsylvania, have invented a new and useful Improvement in Methods of Hardening Synthetic Resins, of which the following is a specification.

My invention relates to methods of manipulating synthetic resins, particularly phenol-aldehyde condensation products, and it has special relation to the application of such methods to the impregnation and induration of porous materials.

More particularly, an object of my invention is to provide an improved method of impregnating the fabric coverings of coils for use in electrical apparatus.

Synthetic resins formed by the condensation of phenolic substances with formaldehyde or other substances having replaceable methylene groups are ordinarily first obtained in the form of liquid or semi-solid products which are afterward transformed into a hard and relatively infusible and insoluble condition by the application of heat and pressure. The hardening of the initial condensation products is accompanied by the evolution or separation of considerable quantities of moisture which must be removed as completely as possible in order to obtain final products having uniform properties.

The initial liquid or viscous condensation products mentioned above are largely used in the impregnation of porous articles, such, for example, as the fabric coverings of electric coils, and it has heretofore been a matter of considerable difficulty to remove the moisture liberated during the hardening process. Such removal of moisture is particularly important in cases where the resin is to serve as electrical insulation, since the moisture, if not completely removed, seriously impairs the insulating value of the resin.

In accordance with my present invention, I accomplish the rapid and complete dehydration of synthetic resins by first subjecting the resin to heat, and preferably to pressure, under such circumstances as to only partially transform the resin into its hardened condition. I have discovered that most, if not all, of the water evolved in the hardening process is liberated during the early stages of such process, and I therefore interrupt the hardening treatment at an intermediate stage, dry the product as thoroughly as possible, preferably by treatment under subatmospheric pressure, and finally complete the hardening treatment by renewed application of heat and pressure.

The application of my present invention to the treatment of fabric-covered electric coils is described in the following example, it being understood that the precise conditions therein set forth are intended to be merely illustrative and not to limit the scope of my invention.

The fabric-covered coils to be treated are preferably dried by treatment in a vacuum chamber and the coverings are then impregnated with a liquid phenolaldehyde condensation product of the familiar bakelite type. The coils are then treated in a bakelizer, under the conditions of heat and pressure ordinarily employed, for a period of about four hours, in order to harden the condensation product to the desired degree. The coils are then removed from the bakelizer and dried as thoroughly as possible in a vacuum chamber. Since the removal of water from the coil coverings leaves them somewhat porous, they should be dipped again into the liquid condensation product in order to seal up the pores. The treated coils are then returned to the bakelizer and the full bakelizing period of about seven hours is completed.

The method which I have described is not limited to the use of any particular variety of impregnating material, except that it contemplates the use of an impregnating material which may be transformed from a non-solid condition to a solid condition with the liberation of moisture. The process steps set forth above may be variously modified without departing from the spirit and intent of my invention and it is therefore to be understood that no limitations are to be imposed upon my invention except such as are indicated in the appended claims.

I claim as my invention:

1. The method of impregnating a porous article that comprises applying thereto a phenolic condensation product, partially hardening the said condensation product, drying the article, again applying a phenol aldehyde condensation product thereto, and completely hardening the condensation product.

2. The method of impregnating a porous article that comprises applying to the article to be impregnated a liquid phenolic condensation product, partially hardening the said condensation product, drying the resulting article, immersing the article in the said liquid condensation product, and then completely hardening the condensation product.

3. The method of impregnating a porous article that comprises drying the article to be impregnated, applying to the article a liquid impregnating material that is capable of hardening under the influence of heat with evolution of moisture, heating the article under such conditions as to partially harden the said impregnating material, drying the article under sub-atmospheric pressure, dipping the article in the said liquid impregnating material and finally heating the said article to completely harden the impregnating material.

4. The method of impregnating a porous article that comprises drying the article to be impregnated under sub-atmospheric pressure, applying a liquid phenolic condensation product thereto, applying sufficient heat and pressure to the article to partially harden the condensation product, drying the article under sub-atmospheric pressure, dipping the article in the said liquid condensation product, and applying further heat and pressure to completely harden the condensation product.

5. The method of hardening an article impregnated with a phenolic condensation product that comprises heating the article to partially harden the condensation product, drying the article at a lower temperature, and then completely hardening the condensation product by further and increased heat.

6. The method of impregnating an article that comprises applying thereto a phenolic condensation product, partially hardening the said condensation product, again applying a phenolic condensation product thereto, and completely hardening the condensation product.

In testimony whereof, I have hereunto subscribed my name this 27th day of Jan., 1916.

RAY P. JACKSON.